R. P. MINSHALL.
Rein-Holders.

No. 149,505.          Patented April 7, 1874.

Witnesses.          Inventor:
H. L. Felton          Robert P. Minshall.
W. K. de Lorimier.

UNITED STATES PATENT OFFICE.

ROBERT P. MINSHALL, OF DUBUQUE, IOWA.

IMPROVEMENT IN REIN-HOLDERS.

Specification forming part of Letters Patent No. 149,505, dated April 7, 1874; application filed September 8, 1873.

*To all whom it may concern:*

Be it known that I, ROBERT P. MINSHALL, of Dubuque, in the county of Dubuque and State of Iowa, have invented a new and useful Improvement in Attachments for Hitching Horses to Vehicles, of which the following is a specification:

My invention relates to a self-acting backlash ratchet ring or band, placed upon the hub or hubs of vehicle-wheels, and to which spring-ratchet the reins are attached or hitched, instead of to a hitching-post, and the action of which, as the wheel or wheels are turned by the starting of the horse, is to wind the reins upon the hub or hubs, and thereby automatically pull upon the reins and bring back the team, and at the same time slacken the reins; and my improvement consists of a spring-ring pawl open at both ends, and sprung within an annular channel formed upon a separate band on the wheel-hub, so as to hold itself in position within said annular channel, and with its end lapped so that the outer lap shall serve as a spring to hold its inner toothed end always in position to act as a ratchet-pawl upon said channeled band, the fitting of the device upon the hub being, by reason of its simple construction, easily made, and not liable to bind or get out of order in winding and slacking the attached rein.

Figure 1:
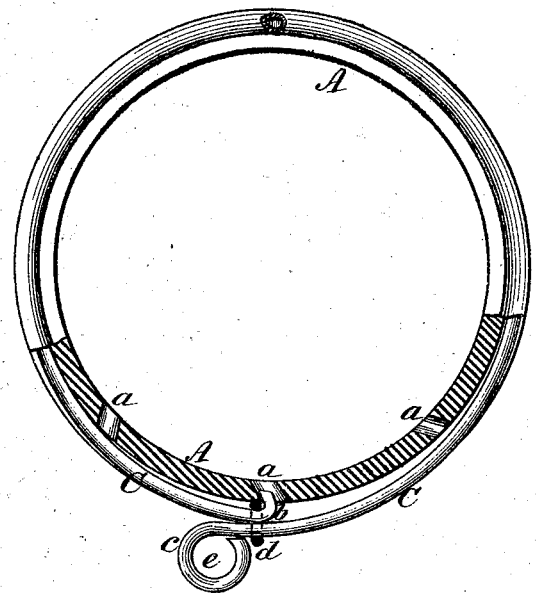
Figure 2:
Figure 3:

In the accompanying drawings, Figure 1 represents a side view of my new automatic hitching device, showing a portion in section; Fig. 2, a cross-section of the same; and Fig. 3, the link which unites the ends of the spring-ratchet.

A metallic band or ring, A, is secured in any suitable way to the hub or hubs of the wheels so that it must turn with the wheel. Its outer circumference has a groove, B, formed by upsetting the band, or in any suitable way, to receive and hold the spring-pawl; and the band A within this groove is provided with a suitable number of holes, $a$, arranged radially or at angles, as shown in Fig. 1, with one side of the holes beveled or inclined. Into this groove B I spring a spring, C, which may be either round or flat in its cross-section, and with its ends lapped, the inner one whereof is formed into a hook, catch, or pawl, $b$, by bending it inward, or in any suitable way, for the purpose of causing it to take into the notches or openings $a$, and for this purpose it is beveled off at one side to match or enter the openings in the band, and allow the pawl to turn freely over the band. The lapped ends of the spring turn upon the band within the groove B, and the outer lapping portion $c$ serves to press upon the pawl or catch end $b$, and hold it in the ratchet-holes $a$. These lapped ends of the spring-ring pawl C are connected by a link, $d$, to keep them together, and the outer end $c$ is formed into an eye, $e$, into which the lines or strap from the bit or head of the horse or horses are fastened. The spring-ring pawl C is put on the hub or hubs in such a way that when the horse starts or moves forward the ratchet catches and holds firmly, thus causing the lines or strap to wind round the hub or hubs, and bring the horse or horses back, thus unwinding the reins and giving them slack, as before. In case the horse or horses back the vehicle, the motion of the wheel is reversed and the ratchet runs in the groove free, (it being self-acting,) and the lines or strap will not wind round the hub or hubs, thus giving the team a slack rein, and there is no danger of drawing the horses back and throwing them.

From the foregoing description it will be seen that the self-acting ratchet catches firmly on the forward movement of the team, but turns freely and with little friction when the vehicle moves backward, thus making a safe and secure mode of hitching, and convenient, as it is always ready and at hand, forming as it does a part of the vehicle.

I do not confine myself in this invention for hitching horses to vehicles, but design to apply the automatic device to any thing where a check is required, and where one part is made to move and give motion to the other part.

I claim—

1. The spring-ring pawl C, combined with ratchet-band A, having annular channeled seat, as and for the purpose set forth.

2. The spring-ring pawl having its end lapped, and with its outer end C having eye for the rein, and serving as a spring to the inner ratchet end, as described.

ROBERT P. MINSHALL.

Witnesses:
 GEO. C. MCKEE,
 ROBERT MCARTHUR.